United States Patent
Terada

(10) Patent No.: US 10,564,532 B2
(45) Date of Patent: Feb. 18, 2020

(54) OPTICAL UNIT AND PROJECTOR INCLUDING THE SAME

(71) Applicant: Konica Minolta, Inc., Tokyo (JP)

(72) Inventor: Masahiro Terada, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 182 days.

(21) Appl. No.: 15/536,929

(22) PCT Filed: Apr. 7, 2015

(86) PCT No.: PCT/JP2015/060840
§ 371 (c)(1),
(2) Date: Jun. 16, 2017

(87) PCT Pub. No.: WO2016/098365
PCT Pub. Date: Jun. 23, 2016

(65) Prior Publication Data
US 2019/0094675 A1  Mar. 28, 2019

(30) Foreign Application Priority Data

Dec. 18, 2014  (JP) ................................. 2014-256493

(51) Int. Cl.
*G03B 21/00* (2006.01)
*G03B 21/20* (2006.01)
(Continued)

(52) U.S. Cl.
CPC ..... *G03B 21/2066* (2013.01); *G02B 26/0833* (2013.01); *G02B 26/10* (2013.01); *G03B 21/008* (2013.01)

(58) Field of Classification Search
CPC .... G03B 21/008; G03B 21/16; G03B 21/208; G03B 21/2013; G03B 21/2066;
(Continued)

(56) References Cited

U.S. PATENT DOCUMENTS 5,612,753 A * 3/1997 Poradish .............. H04N 9/3108
                                                  348/743
6,454,417 B1    9/2002 Takamoto et al.
(Continued)

OTHER PUBLICATIONS

Texas Instruments, "DLP Tilt & Roll Pixel Architecture and DLP IntelliBrightTM," [online], [searched on Oct. 3, 2014], Internet <URL: http://www.dlp.com/pico-projector/pico-product-developers/2trp-chip.aspx> (3 pages).
(Continued)

*Primary Examiner* — Sultan Chowdhury
(74) *Attorney, Agent, or Firm* — Osha Liang LLP

(57) ABSTRACT

An optical unit includes a digital micromirror device that drives each micromirror to be ON/OFF controlled, a first prism that guides illumination light to the digital micromirror device, a second prism having an OFF light reflection surface that reflects OFF light reflected on a micromirror in an OFF state and allows transmission of ON light reflected on a micromirror in an ON state, and a third prism that receives the ON light emitted from the second prism to output the ON light to a projection side. The micromirror reflects the OFF light in such a direction that the optical axis of the OFF light is apart from a projection optical axis plane including the optical axis of the ON light and the optical axis of the illumination light. The second prism emits the OFF light through an emission surface intersecting the projection optical axis plane.

19 Claims, 11 Drawing Sheets

(51) Int. Cl.
*G02B 26/08* (2006.01)
*G02B 26/10* (2006.01)

(58) Field of Classification Search
CPC .... H04N 9/305; H04N 9/3105; H04N 9/3144; H04N 9/3155; H04N 9/3161; H04N 9/3164; H04N 5/7416; H04N 5/7458
See application file for complete search history.

(56) References Cited

U.S. PATENT DOCUMENTS

| | | |
|---|---|---|
| 6,840,634 B1 | 1/2005 | Chang |
| 2003/0147158 A1* | 8/2003 | Penn ........................ G02B 5/04 359/833 |
| 2006/0152686 A1* | 7/2006 | Yeralan .............. G03B 21/2026 353/84 |
| 2017/0052434 A1* | 2/2017 | Masuda ................ G03B 21/16 |

OTHER PUBLICATIONS

International Search Report issued in corresponding International Application No. PCT/JP2015/060840 dated Jun. 23, 2015, and English translation thereof (6 pages).
Written Opinion issued in corresponding International Application No. PCT/JP2015/060840 dated Jun. 23, 2015 (3 pages).

* cited by examiner

OPTICAL UNIT AND PROJECTOR INCLUDING THE SAME

TECHNICAL FIELD

One or more embodiments of the present invention relate to an optical unit including a digital micromirror device configured to drive each micromirror with respect to two axes and to a projector including the optical unit.

BACKGROUND

A typical optical unit has been disclosed in Patent Literatures 1 and 2. The optical unit of Patent Literature 1 is mounted on a projector, and includes a digital micromirror device, a first prism, a second prism, and a third prism. The digital micromirror device is a reflective image display element, and has an image display surface with a plurality of minute micromirrors.

The first prism has a reflection surface configured to reflect illumination light, and the illumination light reflected on the reflection surface is guided to the digital micromirror device. The digital micromirror device is configured to form an image in such a manner that the illumination light is intensity-modulated by ON/OFF control of surface inclination of each micromirror. Each micromirror to be ON/OFF controlled is driven with respect to a single axis, and the inclination angle of a micromirror in an ON state and the inclination angle of a micromirror in an OFF state are different from each other.

The second prism has a total reflection surface configured to allow transmission of ON light reflected on the micromirror in the ON state and to totally reflect OFF light reflected on the micromirror in the OFF state. The ON light transmitted through the total reflection surface is input to the third prism. The third prism is configured to output the ON light toward an image projection side, the ON light having been input from the second prism. In this manner, an image is projected. In this state, the optical axis of the ON light reflected on the digital micromirror device is on the center plane of the first prism, the second prism, and the third prism in the thickness direction thereof. Moreover, the optical axis of the OFF light reflected on the digital micromirror device is on the center plane of the first prism and the second prism in the thickness direction thereof.

When the OFF light (unnecessary light) not to be used for a projected image is input to a projection lens, ghost light is caused. Moreover, when the OFF light is input to the projection lens, a local increase in the temperature of the projection lens occurs, leading to lowering of imaging performance of the projection lens. This lowers the contrast of the projected image. According to the optical unit of Patent Literature 1, the OFF light is reflected on the total reflection surface of the second prism, and is output in a direction different from that of the ON light. Thus, the OFF light is not output to the image projection side, and lowering of the contrast of the projected image due to the OFF light can be prevented.

The optical unit of Patent Literature 2 also includes a digital micromirror device for single-axis control, and a prism having a total reflection surface configured to allow transmission of ON light and to totally reflect OFF light. The OFF light reflected on the total reflection surface is input to one end surface of the prism in the thickness direction thereof, and is absorbed by a light absorption member provided in contact with the end surface. This prevents light diffusion at the end surface.

Moreover, Non Patent Literature 1 discloses a digital micromirror device (Tilt & Roll Pixel DMD) configured to drive each micromirror with respect to two axes perpendicular to each other. In this digital micromirror device, a micromirror reflects OFF light in such a direction that the optical axis of the OFF light is apart from a plane including the optical axis of ON light and the optical axis of illumination light. Thus, the digital micromirror device for two-axis control is mounted on the optical unit as described in Patent Literatures 1 and 2, and the brightness of the projected image can be improved.

CITATION LIST

Patent Literature

Patent Literature 1: U.S. Pat. No. 6,454,417
Patent Literature 2: U.S. Pat. No. 6,840,634

Non Patent Literature

Non Patent Literature 1: TEXAS INSTRUMENTS, "DLP Tilt & Roll Pixel Architecture and DLP IntelliBright™," [online], [searched on Oct. 3, 2014], Internet<URL: http://www.dlp.com/pico-projector/pico-product-developers/2trp-ch ip.aspx>

In the market, there has been a demand for size reduction of an optical unit mounted on a projector. When the digital micromirror device for two-axis control is mounted on the optical unit as described in Patent Literatures 1 and 2, the optical axis of the ON light is on the center plane of the second prism in the thickness direction thereof, and the optical axis of the OFF light is apart from such a center plane. This leads to a situation where the thickness of the second prism is increased and the size of the optical unit is increased.

SUMMARY

One or more embodiments of the present invention may provide an optical unit of which size can be reduced and a projector using the optical unit.

According to one or more embodiments of the present invention, there is provided an optical unit including:

a digital micromirror device configured to form an image in such a manner that illumination light is intensity-modulated by ON/OFF control of surface inclination of each of a plurality of micromirrors at an image display surface including the plurality of micromirrors, and drive, with respect to two axes, each micromirror to be ON/OFF controlled;

a first prism configured to guide the illumination light to the digital micromirror device;

a second prism having an OFF light reflection surface configured to reflect OFF light reflected on at least one of the micromirrors in an OFF state, and allow transmission of ON light reflected on at least one of the micromirrors in an ON state; and a third prism configured to receive the ON light emitted from the second prism to output the ON light to a projection side, wherein the at least one of the micromirrors reflects the OFF light in such a direction that an optical axis of the OFF light is apart from a projection optical axis plane including an optical axis of the ON light and an optical axis of the illumination light, the second prism emits the OFF light through an emission surface intersecting the projection optical axis plane, a region of the second prism on one side of the projection optical axis plane including the optical axis of the OFF light, and an end surface of the region facing the projection optical axis plane forms a reflection surface configured to reflect and guide the OFF light to the emission surface.

According to one or more embodiments of the present invention, in the optical unit configured as described above, a light absorption member may be provided, which faces the emission surface of the second prism with a distance therefrom.

According to one or more embodiments of the present invention, in the optical unit configured as described above, a condition expression (1) is satisfied:

$$\theta a \geq \theta 1 \geq \theta b \quad (1)$$

where $$\theta a = \sin^{-1}(1/n) - \sin^{-1}\{\sin(\alpha + \theta F - 2\cdot\beta)/n\}$$

$$\theta b = \sin^{-1}\sqrt{[\{n^2 - 1 + \cos^2(\alpha - \theta F)\cdot\cos^2(2\cdot\gamma)\}/\{n^2 - \cos^2(\alpha - \theta F)\cdot\sin^2(2\cdot\gamma)\}]} - \sin^{-1}\sqrt{[(n^2 - 1)/\{n^2 - \cos^2(\alpha - \theta F)\cdot\sin^2(2\cdot\gamma)\}]}$$

$$\theta F = \sin^{-1}(\frac{1}{2}\cdot F)$$

α represents an angle between an optical axis of incident light of the digital micromirror device and a normal of the digital micromirror device, β represents an angle between a normal of the at least one of the micromirrors in the ON state and the normal of the digital micromirror device, γ represents an angle between a normal of the at least one of the micromirrors in the OFF state and the normal of the digital micromirror device, n represents a refraction index of the second prism, F represents an F number, and θ1 represents an angle between the normal of the digital micromirror device and a normal of the OFF light reflection surface.

According to one or more embodiments of the present invention, in the optical unit configured as described above, the first prism has an illumination light reflection surface configured to reflect the illumination light, the ON light is transmitted through the illumination light reflection surface, and a condition expression (2) is satisfied:

$$\theta c \geq \theta 2 \geq \theta d \quad (2)$$

where $$\theta c = \sin^{-1}(1/n1) + \sin^{-1}\{\sin(\alpha - \theta F - 2\cdot\beta)/n1\}$$

$$\theta d = \sin^{-1}(1/n1) - \sin^{-1}\{\sin(\alpha - \theta F)/n1\}$$

$$\theta F = \sin^{-1}(\frac{1}{2}\cdot F)$$

n1 represents a refraction index of the first prism, and

θ2 represents an angle between the normal of the digital micromirror device and a normal of the illumination light reflection surface.

According to one or more embodiments of the present invention, in the optical unit configured as described above, the illumination light input to the first prism is transmitted through the first prism, the third prism, and the second prism in this order, and is guided to the micromirrors, the ON light reflected on the at least one of the micromirrors is input to the third prism through the second prism, is reflected on an ON light reflection surface provided at the third prism, and is output toward the projection side, and a condition expression (3) is satisfied:

$$\theta e \geq \theta 3 \geq \theta h \quad (3)$$

where $$\theta e = \sin^{-1}(1/n3) + \sin^{-1}\{\sin(\alpha - \theta F)/n3\}$$

$$\theta h = \sin^{-1}(1/n3) - \sin^{-1}\{\sin(\alpha - \theta F - 2\cdot\beta)/n3\}$$

n3 represents the refraction index of the third prism, and

θ3 represents an angle between the normal of the digital micromirror device and the normal of the ON light reflection surface.

According to one or more embodiments of the present invention, in the optical unit configured as described above, the illumination light emitted from the first prism is guided to the micromirrors through the second prism, and the ON light reflected on the at least one of the micromirrors is transmitted through the second prism, the first prism, and the third prism in this order.

According to one or more embodiments of the present invention, in the optical unit configured as described above, the ON light reflected on the at least one of the micromirrors is transmitted through the first prism, the second prism, and the third prism in this order, and the OFF light reflected on the at least one of the micromirrors is input to the second prism through the first prism.

According to one or more embodiments of the present invention, in the optical unit configured as described above, the first prism and the second prism do not protrude with respect to an emission surface of the third prism, the emission surface being configured to emit the ON light toward the projection side.

According to one or more embodiments of the present invention, in the optical unit configured as described above, the first prism has an illumination light reflection surface configured to reflect the illumination light toward the micromirrors.

According to one or more embodiments of the present invention, in the optical unit configured as described above, the optical unit further includes: a mirror member configured to reflect and guide the illumination light to the first prism, wherein the first prism includes a lens portion configured to collect and guide the illumination light to the digital micromirror device, the illumination light having been reflected on the mirror member.

According to one or more embodiments of the present invention, there is provided a projector including: a light source; the optical unit configured as described above; an illumination optical system configured to emit illumination light toward the optical unit; and a projection optical system configured to enlarge and project an image on a screen, the image being displayed on the digital micromirror device.

Advantageous Effects

According to the optical unit of one or more embodiments of the present invention, the second prism is provided, which includes the OFF light reflection surface configured to reflect the OFF light reflected on the micromirror in the OFF state and allow transmission of the ON light reflected on the micromirror in the ON state. Of emission light of the digital micromirror device configured to drive each micromirror with respect to two axes, the OFF light unnecessary for image projection can be properly spatially separated from the ON light necessary for image projection. Thus, a temperature increase and occurrence of stray light in the optical unit and the projector due to the OFF light can be prevented.

Moreover, the second prism is configured such that the optical axis of the OFF light is in the region on one side of the projection optical axis plane including the optical axis of the ON light and the optical axis of the illumination light on the micromirror and that the emission surface of the OFF light intersects the projection optical axis plane. The end surface of the region of the second prism facing the projection optical axis plane forms the reflection surface, the optical axis of the OFF light being in the region. With this configuration, the thickness of the second prism can be decreased, and the OFF light passing through the second prism can be guided to the emission surface without exiting from the end surface. Thus, the sizes of the optical unit and the projector can be reduced.

DESCRIPTION OF EMBODIMENTS

First Embodiment

Figure 1:
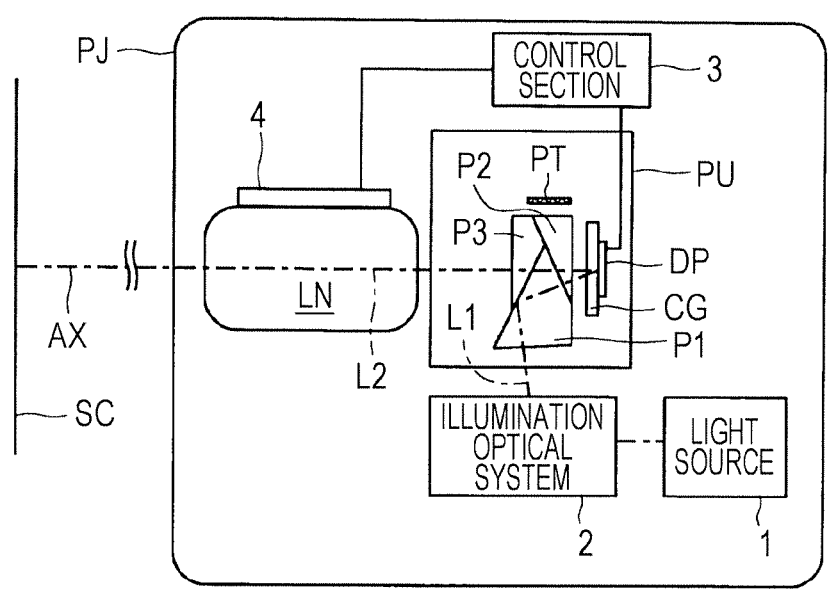
FIG. 1 is a schematic configuration diagram of a projector including an optical unit according to a first embodiment of the present invention.

An embodiment of the present invention will be described below with reference to the drawings. FIG. 1 is a schematic configuration diagram of a projector including an optical unit of the first embodiment. A single-chip type (a single-plate type) projector PJ includes alight source 1, an illumination optical system 2, an optical unit PU, a projection optical system LN, an actuator 4, and a control section 3.

The light source 1 includes, for example, an LED, and is configured to emit white light. The illumination optical system 2 includes a lens 71 (see FIGS. 3 and 4), and is configured to collect light from the light source 1 to emit illumination light L1 toward the optical unit PU. The optical unit PU includes a digital micromirror device DP, a first prism P1, a second prism P2, and a third prism P3, and is supported by a support member (not shown) in the projector PJ. The optical unit PU is configured to output projection light (later-described ON light) toward the projection optical system LN, the projection light having been reflected on the digital micromirror device DP. Note that the optical unit PU will be described below in detail.

Figure 4:
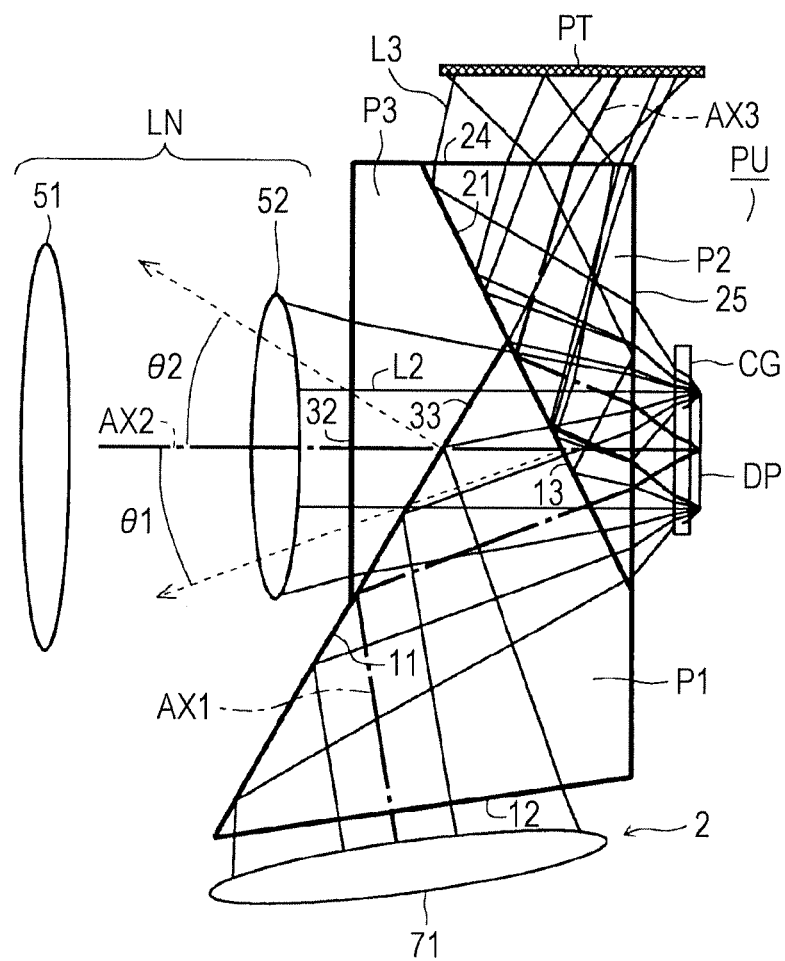
FIG. 4 is a side view of the optical unit according to the first embodiment of the present invention.

The projection optical system LN includes lenses 51, 52 (see FIG. 4). The projection optical system LN is configured to enlarge and project an image onto a screen SC, the image being displayed on the digital micromirror device DP. The actuator 4 is configured to move the lenses 51, 52 to perform zooming, focusing, and upper-to-lower shifting of a projected image, for example. The control section 3 includes a CPU, and is configured to control the entirety of the projector PJ.

Figure 2:
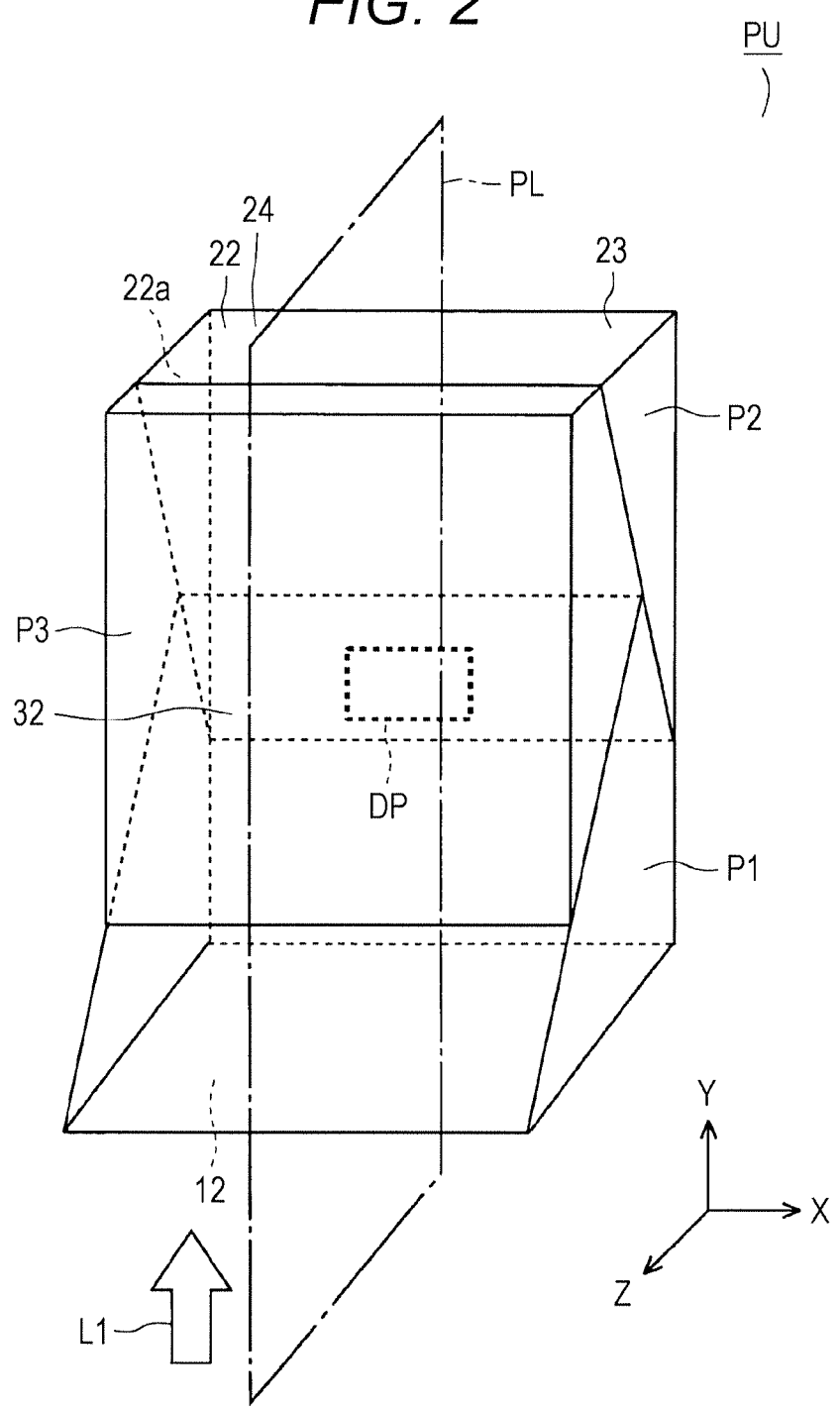
FIG. 2 is a perspective view of the optical unit according to the first embodiment of the present invention.
Figure 3:
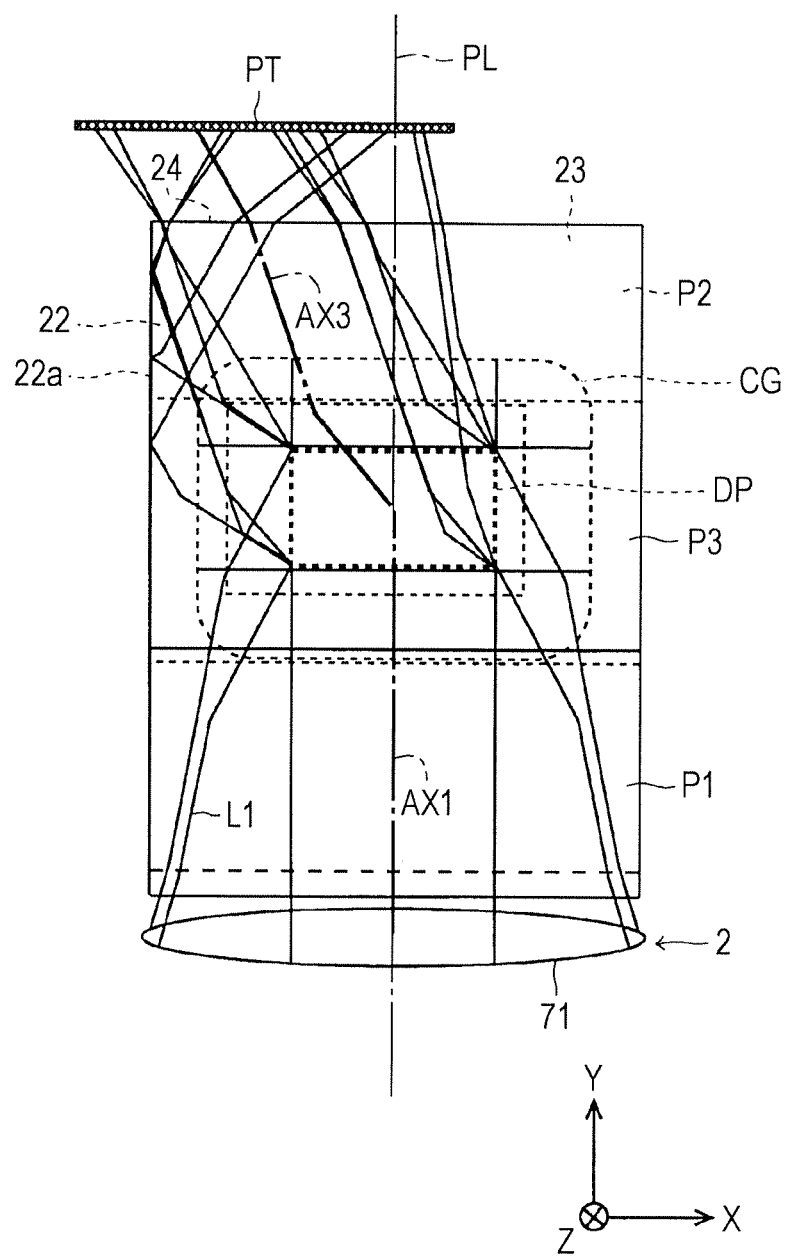
FIG. 3 is a front view of the optical unit according to the first embodiment of the present invention.

FIGS. 2 to 4 are a perspective view, a front view, and a side view of the optical unit PU, respectively. In FIGS. 2 to 4, an X-direction indicates the thickness direction of the first to third prisms P1 to P3. A Z-direction indicates the optical axis direction of the projection light (the later-described ON light) reflected on the digital micromirror device DP. A Y-direction indicates a direction perpendicular to the X-direction and the Z-direction.

The first to third prisms P1 to P3 each include a total internal reflection prism (a TIR prism), and glass can be used as the material of these prisms, for example. In the present embodiment, the first to third prisms P1 to P3 are made of glass having the same refraction index. The support member is disposed in contact with both side surfaces (both end surfaces in the thickness direction of the first to third prisms) of the optical unit PU, and sandwiches the optical unit PU.

The second prism P2 and the first prism P1 are arranged between the digital micromirror device DP and the third prism P3. The second prism P2 is disposed between the digital micromirror device DP and the first prism P1, and the first prism P1 is disposed between the second prism P2 and the third prism P3. Note that an air gap layer (not shown) is provided between the first prism P1 and the second prism P2, between the second prism P2 and the third prism P3, and between the first prism P1 and the third prism P3.

In front projection, the digital micromirror device DP is disposed to overlap with the first to third prisms P1 to P3, and is disposed at a center portion of the second prism P2 in the thickness direction thereof (the X-direction). Moreover, a cover glass CG is provided between the digital micromirror device DP and the second prism P2.

Figure 6:
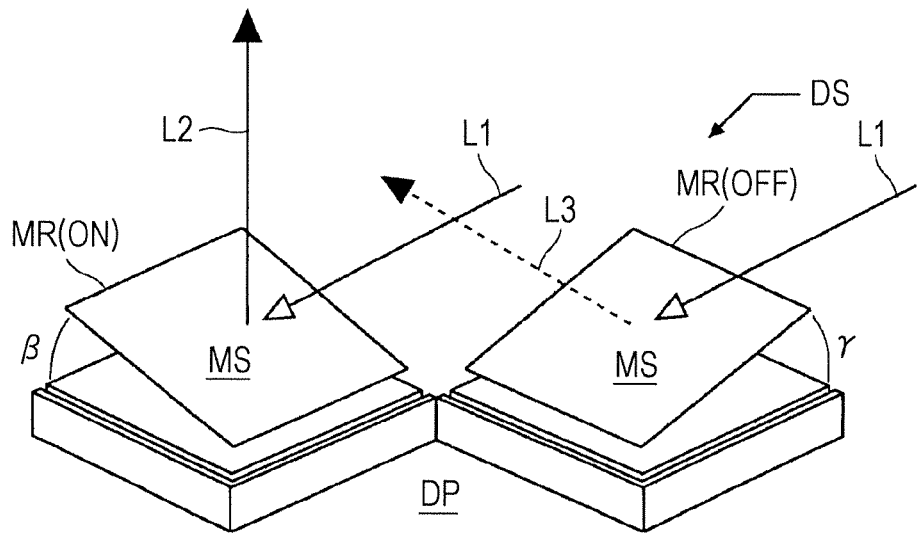
FIG. 6 is a perspective view for describing operation of the digital micromirror device of the optical unit according to the first embodiment of the present invention.
Figure 7:
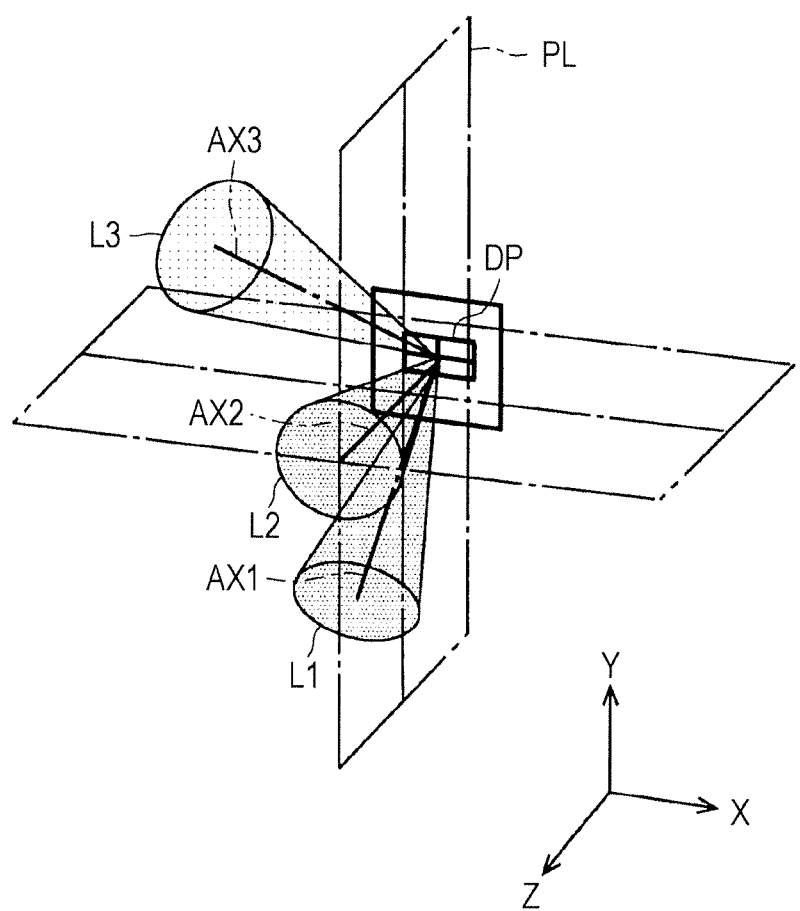
FIG. 7 is a schematic view illustrating illumination light for the micromirror of the digital micromirror device of the optical unit according to the first embodiment of the present invention, ON light reflected on the micromirror in the ON state, and OFF light reflected on the micromirror in the OFF state.

The digital micromirror device DP is configured to form an image in such a manner that the illumination light L1 is intensity-modulated by ON/OFF control of surface inclination of each micromirror MR (see FIG. 6). ON light L2 reflected on the micromirror MR in an ON state is output from the optical unit PU, and is used for image display. On the other hand, OFF light L3 reflected on the micromirror MR in an OFF state is not used for image display. As illustrated in FIG. 7, the micromirror MR reflects the OFF light L3 in such a direction that the optical axis AX3 of the OFF light L3 is apart from a projection optical axis plane PL including the optical axis AX2 of the ON light L2 and the optical axis AX1 of the illumination light L1. Note that the digital micromirror device DP will be described below in detail.

The first prism P1 includes an incident surface 12, an illumination light reflection surface 11, and an emission surface 13. The incident surface 12 inclines with respect to the Z-direction, and faces the lens 71 to input the illumination light L1. The illumination light reflection surface 11 inclines closer to the digital micromirror device DP with a distance from the lens 71, and reflects the illumination light L1 input from the incident surface 12. The emission surface 13 faces the second prism P2, and emits the illumination light L1 reflected on the illumination light reflection surface 11.

The second prism P2 includes an OFF light reflection surface 21, an emission surface 24, and an incident surface 25. The incident surface 25 faces the cover glass CG to input the ON light L2 and the OFF light L3 reflected on the digital micromirror device DP. The OFF light reflection surface 21 inclines farther from the digital micromirror device DP with a distance from the lens 71. The OFF light reflection surface 21 allows transmission of the ON light L2 input from the incident surface 25, and reflects the OFF light L3. The emission surface 24 formed by a transmission surface (a polished surface) is formed on the opposite side of the optical axis AX2 of the ON light L2 from the incident surface 12, the ON light L2 having been reflected on the micromirror MR in the ON state. The emission surface 24 emits the OFF light L3 reflected on the OFF light reflection surface 21.

The second prism P2 includes a first region 22 on one side (the left side in FIG. 3) with respect to the projection optical axis plane PL, and a second region 23 on the other side (the right side in FIG. 3) with respect to the projection optical axis plane PL. The length of the first region 22 in the normal direction (the X-direction) of the projection optical axis plane PL is substantially the same as the length of the second region 23 in the normal direction (the X-direction) of the projection optical axis plane PL. The optical axis AX3 of the OFF light L3 is included in the first region 22.

An end surface 22a of the first region 22 facing the projection optical axis plane PL is formed by a total reflection surface. The end surface 22a reflects the OFF light L3, and guides such light to the emission surface 24 intersecting the end surface 22a. Note that the reflection surface may be formed in such a manner that metal such as aluminum or silver is vapor-deposited on the end surface 22a. With this configuration, even in the case where an air space cannot be ensured on the outside of the end surface 22a, such as the case where the support member disposed in contact with the outside of the end surface 22a sandwiches the optical unit PU, the end surface 22a can reliably reflect the OFF light L3.

Moreover, alight absorption member PT is provided facing the emission surface 24 of the second prism P2 with a distance therefrom. The light absorption member PT is formed of, e.g., a metal plate subjected to blackening, and is configured to absorb the OFF light L3 emitted from the emission surface 24.

The third prism P3 includes an incident surface 33 and an emission surface 32. The incident surface 33 inclines closer to the digital micromirror device DP with a distance from the lens 71, and is configured to input the ON light L2 transmitted through the OFF light reflection surface 21 of the second prism P2. The emission surface 32 faces the lenses 51, 52 of the projection optical system LN, and is configured to emit the ON light L2 input from the incident surface 33. An end portion of the first prism P1 closer to the projection optical system LN protrudes toward an emission side with respect to the emission surface 32 of the third prism P3. Note that the first prism P1 may be formed not to protrude toward the emission side with respect to the emission surface 32.

When light is emitted from the light source 1 in the projector PJ configured as described above, the light is collected by the lens 71 of the illumination optical system 2, and then, the illumination light L1 is emitted toward the optical unit PU. The illumination light L1 is input to the incident surface 12 of the first prism P1, and then, is reflected on the illumination light reflection surface 11. The illumination light L1 reflected on the illumination light reflection surface 11 is emitted from the emission surface 13, and then, is input to the second prism P2 through the OFF light reflection surface 21. The illumination light L1 input to the second prism P2 is sequentially transmitted through the second prism P2 and the cover glass CG, and then, is input to the digital micromirror device DP. Thus, the first prism P1 guides the illumination light L1 to the digital micromirror device DP.

Figure 5:
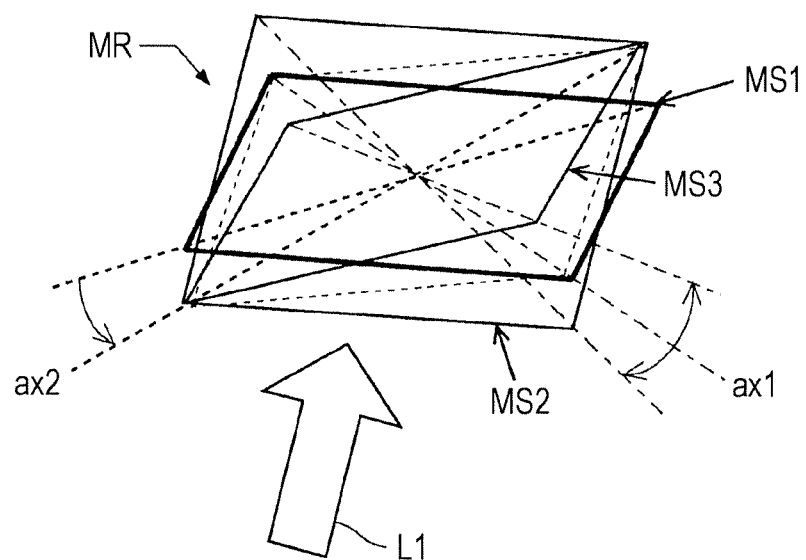
FIG. 5 is a perspective view illustrating a reference state, an ON state, and an OFF state of a micromirror of a digital micromirror device of the optical unit according to the first embodiment of the present invention.

FIG. 5 is a perspective view of a reference state, the ON state, and the OFF state of the micromirror MR of the digital micromirror device DP. FIG. 6 is a perspective view for describing operation of the digital micromirror device DP. The digital micromirror device DP includes the plurality of minute rectangular micromirrors MR, and a pixel reflection surface (a micromirror surface) MS of the micromirror MR forming a pixel is formed.

In FIG. 5, the reference state of the micromirror MR is indicated by a reference plane MS1, the ON state of the micromirror MR is indicated by a reflection surface MS2, and the OFF state of the micromirror MR is indicated by a reflection surface MS3. After inclining from the reference state with respect to a first axis ax1, the micromirror MR can rotate with respect to a second axis ax2. With this configuration, the digital micromirror device DP is configured such that ON/OFF of each pixel reflection surface MS is controlled at an image display surface DS including the plurality of pixel reflection surfaces MS, and as a result, the micromirrors MR are in two angle states of an image display state (the ON state) and an image non-display state (the OFF state). That is, the digital micromirror device DP drives the micromirrors MR with respect to two axes perpendicular to each other, and the micromirrors MR can be in the reference state, the ON state, and the OFF state. With this configuration, the digital micromirror device DP forms a reflective image display element configured to generate a desired image by intensity modulation of the illumination light L1.

Each micromirror MR is driven with respect to two axes (the first axis ax1, the second axis ax2) perpendicular to each other, and therefore, the pixel reflection surfaces MS of the micromirrors MR incline in different planes. In the present embodiment, the state of inclination in a YZ plane is the ON state, and the state of inclination in an XZ plane is the OFF state. In typically-conceivable ON/OFF control, when the pixel reflection surface MS is in the ON state, the illumination light L1 input to the micromirror MR is reflected in the normal (the normal of the digital micromirror device DP) direction of the image display surface DS, and is converted into the ON light L2 (the projection light). On the other hand, when the pixel reflection surface MS is in the OFF state, the illumination light L1 input to the micromirror MR is reflected with a great angle from the normal direction of the image display surface DS, and is converted into the OFF light L3 (unnecessary light).

Thus, as illustrated in FIG. 7, the micromirror MR reflects the OFF light L3 in such a direction that the optical axis AX3 of the OFF light L3 is apart from the projection optical axis plane PL including the optical axis AX2 of the ON light L2 and the optical axis AX1 of the illumination light L1. Moreover, the normal of the image display surface DS (the normal of the digital micromirror device DP) is parallel to the optical axis AX2 of the ON light L2 (the projection light) in the vicinity of the digital micromirror device DP.

As described above, a two-dimensional image is formed by intensity modulation of the illumination light L1 on the image display surface DS of the digital micromirror device DP. The digital micromirror device DP drives each micromirror MR with respect to two axes perpendicular to each other as described above, thereby showing ON/OFF.

The ON light L2 reflected on the micromirror MR in the ON state is input to the second prism P2 through the incident surface 25 thereof. After having been transmitted through the OFF light reflection surface 21, the ON light L2 is input to the first prism P1. The ON light L2 input to the first prism P1 is transmitted through the illumination light reflection surface 11, and then, is input to the third prism P3 through the incident surface 33. The ON light L2 input to the third prism P3 is transmitted through the third prism P3, and then, is emitted from the emission surface 32 toward the projection optical system LN.

The ON light L2 input to the projection optical system LN is projected onto the screen SC (see FIG. 1). As a result, the image displayed on the digital micromirror device DP is enlarged and projected onto the screen SC. In this state, e.g., zooming, focusing, or upper-to-lower shifting (movement in the Y-direction) of the projected image is performed by the actuator 4.

Meanwhile, the OFF light L3 reflected on the micromirror MR in the OFF state is input to the second prism P2 through the incident surface 25 thereof, and then, is reflected on the OFF light reflection surface 21. In this state, a portion of the OFF light L3 reflected on the micromirror MR is reflected on the end surface 22a of the first region 22. With this configuration, diffusion of the OFF light L3 input to the end surface 22a can be prevented. The OFF light L3 reflected on the OFF light reflection surface 21 and the end surface 22a is emitted from the emission surface 24, and then, is discharged to the outside of the second prism P2. The OFF light L3 discharged from the second prism P2 is absorbed by the light absorption member PT.

In this state, the light absorption member PT is provided apart from the emission surface 24 of the second prism P2. With this configuration, transfer of heat from the light absorption member PT having absorbed the OFF light L3 to the second prism P2 can be reduced. Thus, an increase in the temperature of the second prism P2 can be suppressed, and, e.g., thermal deformation of the second prism P2 can be prevented. As a result, the lives of the optical unit PU and the projector PJ can be increased.

Note that the illumination light L1 (flat light) reflected on the micromirror MR being in transition from one of the ON state or the OFF state to the other one of the ON state or the OFF state is reflected in the direction opposite to the illumination light L1 with respect to the normal direction of the micromirror MR. The flat light and the illumination light L1 reflected on the cover glass CG are also input to the second prism P2, and then, are reflected on the OFF light reflection surface 21 and the end surface 22a of the first region 22. Subsequently, such light is emitted from the emission surface 24. This can prevent the flat light and the illumination light L1 reflected on the cover glass CG from entering the projection optical system LN. Thus, lowering of the contrast of the projected image can be prevented.

Note that in the present embodiment, a color wheel (not shown) may be provided between the illumination optical system 2 and the light source 1. The color wheel includes an annular frame, and filters of red, blue, and green are sequentially arranged in a circumferential direction in the frame. A color image can be projected in such a manner that the illumination light L1 is transmitted through the filters by rotation of the color wheel in the circumferential direction.

An angle $\theta 1$ between the normal of the digital micromirror device DP and the normal of the OFF light reflection surface 21 satisfies the following condition expression (1). This is because the OFF light reflection surface 21 allows transmission of the ON light L2, and can substantially totally reflect the OFF light L3.

$$\theta a \geq \theta 1 \geq \theta b \quad (1)$$

where $$\theta a = \sin^{-1}(1/n) - \sin^{-1}\{\sin(\alpha + \theta F - 2\cdot\beta)/n\}$$

$$\theta b = \sin^{-1}\sqrt{[\{n^2-1+\cos^2(\alpha-\theta F)\cdot\cos^2(2\cdot\gamma)\}/\{n^2-\cos^2(\alpha-\theta F)\cdot\sin^2(2\cdot\gamma)\}]} - \sin^{-1}\sqrt{[(n^2-1)/\{n^2-\cos^2(\alpha-\theta F)\cdot\sin^2(2\cdot\gamma)\}]}$$

$$\theta F = \sin^{-1}(\frac{1}{2}\cdot F)$$

$\alpha$ represents an angle between the optical axis of incident light of the digital micromirror device DP and the normal of the digital micromirror device DP, $\beta$ represents an angle between the normal of the micromirror MR in the ON state and the normal of the digital micromirror device DP, $\gamma$ represents an angle between the normal of the micromirror MR in the OFF state and the normal of the digital micromirror device DP, n represents the refraction index of the second prism P2, and F represents an F number.

Figure 8:
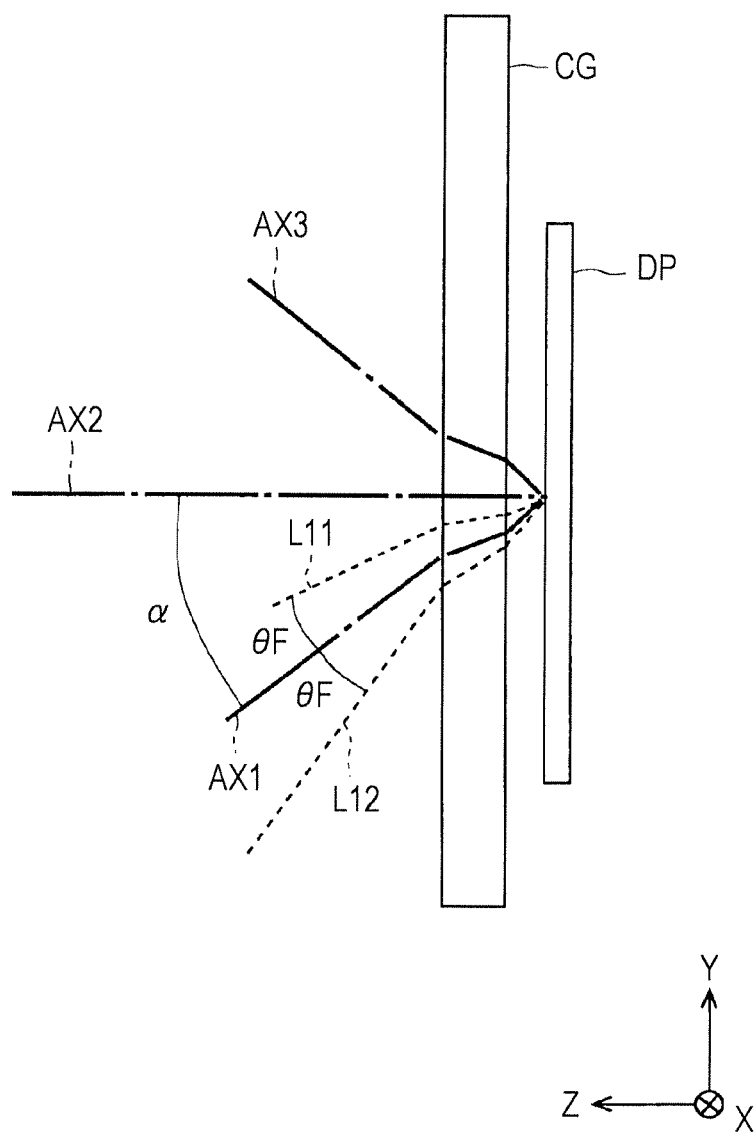
FIG. 8 is an enlarged side view of the periphery of the digital micromirror device of the optical unit according to the first embodiment of the present invention.

As illustrated in FIG. 8, the illumination light L1 having the optical axis AX1 on the projection optical axis plane PL shows a spread with an angle $\theta F$ based on the F number. An angle $\theta a$ represents such an angle that an incident angle is a critical angle when a light beam (a lower ray) L12 of the illumination light L1 farthest from the optical axis AX2 of the ON light L2 is, as the ON light, input to the OFF light reflection surface 21. An angle $\theta b$ represents such an angle that the incident angle is the critical angle when a light beam (an upper ray) L11 of the illumination light L1 closest to the optical axis AX2 of the ON light L2 is, as the OFF light, input to the OFF light reflection surface 21.

For example, 30.64°≥θ1≥24.07° is satisfied when $\alpha=34°$, $\beta=17°$, $\gamma=17°$, n=1.51872, and an F number of F/1.80. In this state, the OFF light reflection surface 21 allows transmission of the ON light L2, and can substantially totally reflect the OFF light L3.

When the OFF light reflection surface 21 is formed with the lower angle limit of the angle $\theta 1$ being set to 24.07°, the length of the optical unit PU in the direction (the Z-direction) of the optical axis AX2 of the ON light L2 (the projection light) can be shortened. This can shorten the back focal length (a distance from the foremost surface of the lens 51 to the image display surface DS) of the projection optical system LN. Thus, the sizes of the optical unit PU and the projector PJ can be reduced.

Note that for totally reflecting the OFF light L3 with an F number of F/1.08, it is necessary that the angle $\theta 1$ is equal to or higher than 25.34°. However, the OFF light L3 which cannot be totally reflected on the OFF light reflection surface 21 is only the OFF light L3 with an F number of F/1.80 to F/2.04 in one direction in which the incident angle with respect to the OFF light reflection surface 21 is smaller. Thus, as long as the above-described condition expression (1) is satisfied, a majority of the OFF light L3 can be reflected on the OFF light reflection surface 21, and therefore, output toward a projection side can be prevented. Thus, lowering of the contrast of the projected image can be prevented.

The F number may be F/2.04. This is because 100-percent total reflection of the OFF light L3 on the OFF light reflection surface 21 can be realized.

Moreover, an angle θ2 between the normal of the digital micromirror device DP and the normal of the illumination light reflection surface 11 satisfies the following condition expression (2). This is because the illumination light reflection surface 11 allows transmission of the ON light L2, and can substantially totally reflect the illumination light L1.

$$\theta c \geq \theta 2 \geq \theta d \quad (2)$$

where $$\theta c = \sin^{-1}(1/n1) + \sin^{-1}\{\sin(\alpha - \theta F - 2\cdot\beta)/n1\}$$

$$\theta d = \sin^{-1}(1/n1) - \sin^{-1}\{\sin(\alpha - \theta F)/n1\}$$

$$\theta F = \sin^{-1}(\frac{1}{2}\cdot F)$$

α represents the angle between the optical axis of incident light of the digital micromirror device DP and the normal of the digital micromirror device DP, β represents the angle between the normal of the micromirror MR in the ON state and the normal of the digital micromirror device DP, n1 represents the refraction index of the first prism P1, and F represents the F number.

An angle θc represents such an angle that the incident angle is the critical angle when the light beam L11 (see FIG. 8) is, as the ON light, input to the illumination light reflection surface 11. An angle θd represents such an angle that the incident angle is the critical angle when the light beam L11 (see FIG. 8) input from the incident surface 12 is, as the illumination light, input to the illumination light reflection surface 11.

For example, 30.64°≥θ2≥29.52° is satisfied when α=34°, β=17°, γ=17°, n1=1.51872, and an F number of F/1.80. In this state, the illumination light reflection surface 11 allows transmission of the ON light L2, and can substantially totally reflect the illumination light L1.

When the illumination light reflection surface 11 is formed with the lower angle limit of the angle θ2 being set to 29.52°, the length of the optical unit PU in the direction (the Z-direction) of the optical axis AX2 of the ON light L2 (the projection light) can be shortened. This can shorten the back focal length (the distance from the foremost surface of the lens 51 to the image display surface DS) of the projection optical system LN. Thus, the sizes of the optical unit PU and the projector PJ can be reduced.

According to the present embodiment, the second prism P2 is provided, which includes the OFF light reflection surface 21 configured to reflect the OFF light L3 reflected on the micromirror MR in the OFF state and to allow transmission of the ON light L2 reflected on the micromirror MR in the ON state. Of reflection light of the digital micromirror device DP configured to drive each micromirror MR with respect to two axes, the OFF light L3 unnecessary for image projection can be properly spatially separated from the ON light L2 necessary for image projection. Thus, occurrence of ghost light due to incidence of the OFF light L3 into the projection optical system LN can be prevented. Moreover, a local increase in the temperature of the projection optical system LN due to incidence of the OFF light L3 into the projection optical system LN can be prevented. Consequently, lowering of imaging performance of the projection optical system LN can be prevented, and lowering of the contrast of the projected image can be prevented.

Moreover, the second prism P2 is configured such that the optical axis AX3 of the OFF light L3 is in the first region 22 on one side of the projection optical axis plane PL including the optical axis AX2 of the ON light L2 and the optical axis AX1 of the illumination light L1 on the micromirror MR and that the emission surface 24 of the OFF light L3 intersects the projection optical axis plane PL. The end surface 22a of the first region 22 of the second prism P2 facing the projection optical axis plane PL forms the reflection surface, the optical axis AX3 of the OFF light L3 being in the first region 22. With this configuration, the thickness of the second prism P2 can be decreased, and the OFF light L3 passing through the second prism P2 can be guided to the emission surface 24 without exiting from the end surface 22a. Thus, the sizes of the optical unit PU and the projector PJ can be reduced.

When the condition expression (1) is satisfied, the OFF light reflection surface 21 allows transmission of the ON light L2, and can substantially totally reflect the OFF light L3.

When the condition expression (2) is satisfied, the illumination light reflection surface 11 allows transmission of the ON light L2, and can substantially totally reflect the illumination light L1.

The illumination light L1 emitted from the first prism P1 is guided to the micromirror MR through the second prism P2, and the ON light L2 reflected on the micromirror MR is transmitted through the second prism P2, the first prism P1, and the third prism P3 in this order. With this configuration, incidence of the OFF light L3 into the projection optical system LN can be prevented, and the back focal length of the projection optical system LN can be shortened.

The projector PJ includes the illumination optical system 2 configured to emit the illumination light L1 to the optical unit PU, and the projection optical system LN configured to enlarge and project the image on the screen SC, the image being displayed on the digital micromirror device DP. With this configuration, the size of the projector PJ can be reduced, and the projector PJ can project a high-contrast image.

Second Embodiment

Figure 9:
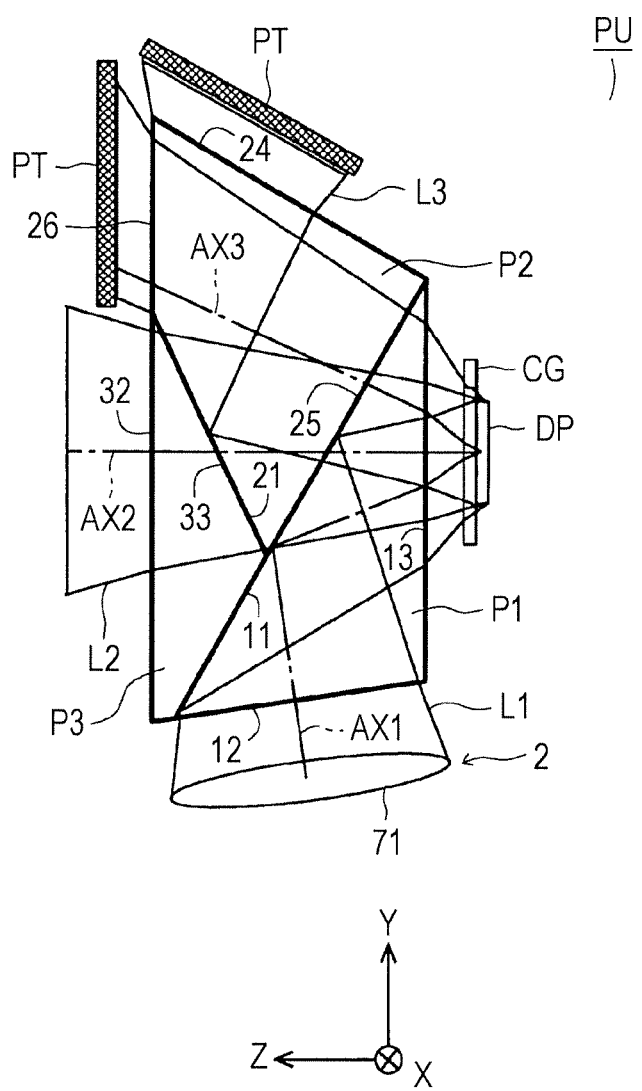
FIG. 9 is a side view of an optical unit according to a second embodiment of the present invention.

Next, a second embodiment of the present invention will be described. FIG. 9 is a side view of an optical unit of the second embodiment. For the sake of description, the same reference numerals as those of the first embodiment illustrated in FIGS. 1 to 8 are used to represent equivalent elements. In the present embodiment, arrangement of first to third prisms P1 to P3 is different from that of the first embodiment. Other points are similar to those of the first embodiment.

The first prism P1 and the second prism P2 are arranged between a digital micromirror device DP and the third prism P3. The second prism P2 is disposed between the first prism P1 and the third prism P3. The first prism P1 is disposed between the digital micromirror device DP and the second prism P2.

An emission surface 13 of the first prism P1 faces a cover glass CG. An incident surface 25 of the second prism P2 inclines closer to the digital micromirror device DP with a distance from a lens 71. An OFF light reflection surface 21 inclines farther from the digital micromirror device DP with a distance from the lens 71. An emission surface 26 configured to emit OFF light L3 is formed at a front surface of the second prism P2. A light absorption member PT is provided facing the emission surface 26 with a distance therefrom. An incident surface 33 inclines farther from the digital micromirror device DP with a distance from the lens 71.

The first prism P1 and the second prism P2 do not protrude toward an image projection side with respect to an emission surface 32 of the third prism P3. With this configuration, contact among lenses 51, 52 of a projection optical system LN moving in a Z-direction and the optical unit PU can be prevented even when a distance between the optical unit PU and the lens 51 is shortened. Thus, zooming in/out of a projected image can be facilitated. Moreover, contact among the lenses 51, 52 of the projection optical system LN moving in a Y-direction and the optical unit PU can be prevented. Thus, upper-to-lower shifting (movement in the Y-direction) of the projected image by the projection optical system LN can be facilitated. Further, other members (e.g., a smooth picture) can be arranged between the emission surface 32 and the lens 51 without an increase in the back focal length of the projection optical system LN.

In the optical unit PU of the present embodiment, illumination light L1 input to the first prism P1 from an incident surface 12 is reflected on an illumination light reflection surface 11, and then, is emitted from the emission surface 13 toward the digital micromirror device DP. ON light L2 reflected on a micromirror MR in an ON state is transmitted through the illumination light reflection surface 11 of the first prism P1, and then, is input to the second prism P2 through the incident surface 25. The ON light L2 input to the second prism P2 is transmitted through the OFF light reflection surface 21, and then, is input to the third prism P3 through the incident surface 33. The ON light L2 input to the third prism P3 is emitted from the emission surface 32 toward the projection optical system LN. With this configuration, the ON light L2 reflected on the micromirror MR in the ON state is transmitted through the first prism P1, the second prism P2, and the third prism P3 in this order.

Meanwhile, the OFF light L3 reflected on a micromirror MR in an OFF state is transmitted through the illumination light reflection surface 11 of the first prism P1, and then, is input to the second prism P2. Then, the OFF light L3 input to the second prism P2 is reflected on the OFF light reflection surface 21 and an end surface 22a of a first region 22, and then, is emitted from an emission surface 24 to the outside of the second prism P2. Note that in this state, a portion of the OFF light L3 is emitted from the emission surface 26 without reflection on the OFF light reflection surface 21, and then, is absorbed by the light absorption member PT facing the emission surface 26.

In the present embodiment, advantageous effects similar to those of the first embodiment can be also provided. Moreover, the first prism P1 and the second prism P2 do not protrude toward the image projection side with respect to the emission surface 32 of the third prism P3. With this configuration, contact among the lenses 51, 52 of the projection optical system LN moving in the Y-direction and the optical unit PU can be prevented. Thus, upper-to-lower shifting of the projected image by the projection optical system LN can be facilitated.

Third Embodiment

Figure 10:
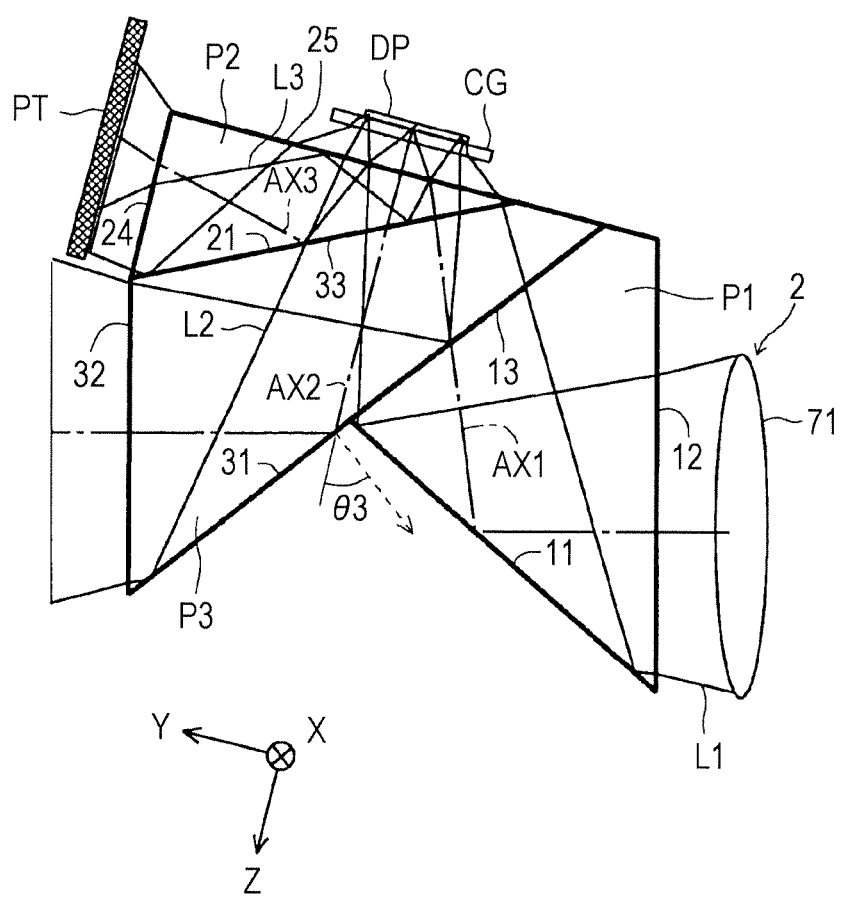
FIG. 10 is a side view of an optical unit according to a third embodiment of the present invention.

Next, a third embodiment of the present invention will be described. FIG. 10 is a side view of an optical unit of the third embodiment. For the sake of description, the same reference numerals as those of the first embodiment illustrated in FIGS. 1 to 8 are used to represent equivalent elements. In the present embodiment, arrangement of first to third prisms P1 to P3 is different from that of the first embodiment. Moreover, the present embodiment is different from the first embodiment in that an ON light reflection surface 31 is provided at the third prism P3. Other points are similar to those of the first embodiment.

The second prism P2 and the third prism P3 are arranged between a digital micromirror device DP and the first prism P1. The third prism P3 is disposed between the first prism P1 and the second prism P2. The second prism P2 is disposed between the digital micromirror device DP and the third prism P3. Moreover, the first prism P1 and the third prism P3 are arranged such that an incident surface 12 of the first prism P1 and an emission surface 32 of the third prism P3 are substantially parallel to each other.

An emission surface 13 of the first prism P1 inclines closer to a projection optical system LN (see FIG. 4) with a distance from a lens 71. An illumination light reflection surface 11 inclines closer to the digital micromirror device DP with a distance from the lens 71. The illumination light reflection surface 11 is formed in such a manner that metal such as aluminum or silver is vapor-deposited. Note that the illumination light reflection surface 11 may be formed of a dielectric multilayer film.

An incident surface 25 of the second prism P2 faces a cover glass CG. An OFF light reflection surface 21 inclines farther from the digital micromirror device DP with a distance from the lens 71. An emission surface 24 is formed at a front surface of the second prism P2.

An incident surface 33 of the third prism P3 inclines farther from the digital micromirror device DP with a distance from the lens 71. Moreover, the third prism P3 has the ON light reflection surface 31 inclining closer to the projection optical system LN with a distance from the digital micromirror device DP. The ON light reflection surface 31 allows transmission of illumination light L1, and reflects and guides ON light L2 toward the emission surface 32.

In the optical unit PU of the present embodiment, the illumination light L1 input to the first prism P1 through the incident surface 12 is reflected on the illumination light reflection surface 11, and then, is input to the third prism P3 from the emission surface 13. The illumination light L1 transmitted through the third prism P3 is transmitted through the second prism P2 through the OFF light reflection surface 21. The illumination light L1 transmitted through the second prism P2 is input to the digital micromirror device DP. That is, the illumination light L1 is transmitted through the first prism P1, the third prism P3, and the second prism P2 in this order.

The ON light L2 reflected on a micromirror MR in an ON state is input to the second prism P2 through the incident surface 25. Then, the ON light L2 is transmitted through the OFF light reflection surface 21, and then, is input to the third prism P3. The ON light L2 input to the third prism P3 is reflected on the ON light reflection surface 31, and then, is emitted from the emission surface 32 toward the projection optical system LN. In this state, the optical axis of incident light of the illumination light reflection surface 11 and the optical axis of reflected light of the ON light reflection surface 31 are substantially parallel to each other.

Meanwhile, OFF light L3 reflected on a micromirror MR in an OFF state is input to the second prism P2 through the incident surface 25. The OFF light L3 input to the second prism P2 is reflected on the OFF light reflection surface 21 and an end surface 22a of a first region 22, and then, is emitted from the emission surface 24. Subsequently, such light is discharged to the outside of the second prism P2.

An angle θ3 between the normal of the digital micromirror device DP and the normal of the ON light reflection surface 31 satisfies the following condition expression (3). This is because the ON light reflection surface 31 allows transmission of the illumination light L1, and can substantially totally reflect the ON light L2.

$$\theta e \geq \theta 3 \geq \theta h \quad (3)$$

where $$\theta e = \sin^{-1}(1/n3) + \sin^{-1}\{\sin(\alpha - \theta F)/n3\}$$

$$\theta h = \sin^{-1}(1/n3) - \sin^{-1}\{\sin(\alpha - \theta F - 2\cdot\beta)/n3\}$$

$$\theta F = \sin^{-1}(\tfrac{1}{2}\cdot F)$$

α represents an angle between the optical axis of incident light of the digital micromirror device DP and the normal of the digital micromirror device DP, β represents an angle between the normal of the micromirror MR in the ON state and the normal of the digital micromirror device DP, n3 represents the refraction index of the third prism P3, and F represents an F number.

An angle θe represents such an angle that an incident angle is a critical angle when a light beam L11 (see FIG. 8) is, as the illumination light, input to the ON light reflection surface 31. An angle θh represents such an angle that the incident angle is the critical angle when the light beam L11 is, as the ON light, input to the ON light reflection surface 31.

For example, 52.84°≥θ3≥51.72° is satisfied when α=34°, β=17°, γ=17°, n3=1.51872, and an F number of F/1.80. In this state, the ON light reflection surface 31 allows transmission of the illumination light L1, and can substantially totally reflect the ON light L2.

In the present embodiment, advantageous effects similar to those of the first embodiment can be also provided. Moreover, the first prism P1 has the illumination light reflection surface 11 configured to reflect the illumination light L1 toward the micromirror MR. The illumination light L1 is transmitted through the third prism P3 and the second prism P2 in this order, and then, is guided to the micromirror MR. The ON light L2 reflected on the micromirror MR is input to the third prism P3 through the second prism P2. Then, the ON light L2 is reflected on the ON light reflection surface 31, and then, is output toward a projection side. With this configuration, the length of the optical unit PU in a Z-direction can be shortened, leading to size reduction of a projector PJ.

Moreover, the condition expression (3) is satisfied. This is because the ON light reflection surface 31 allows transmission of the illumination light L1, and can substantially totally reflect the ON light L2.

Fourth Embodiment

Figure 11:
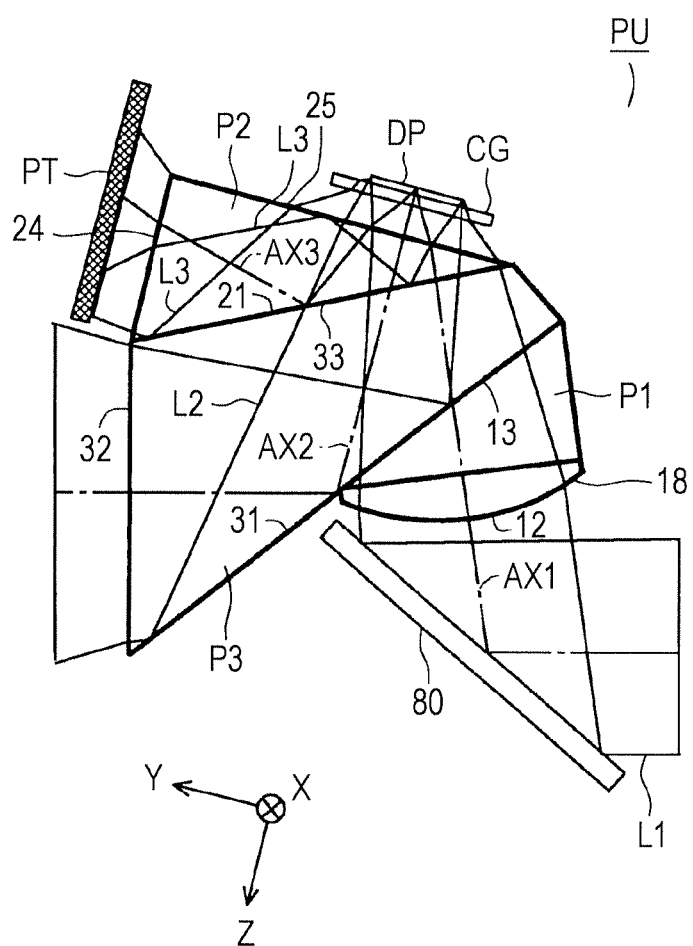
FIG. 11 is a side view of an optical unit according to a fourth embodiment of the present invention.

Next, a fourth embodiment of the present invention will be described. FIG. 11 is a side view of an optical unit of the fourth embodiment. For the sake of description, the same reference numerals as those of the first embodiment illustrated in FIGS. 1 to 8 and the third embodiment illustrated in FIG. 10 are used to represent equivalent elements. In the present embodiment, arrangement of first to third prisms P1 to P3 is different from that of the first embodiment. More-over, the present embodiment is different from the third embodiment in the configuration of the first prism P1. Other points are similar to those of the first and third embodiments.

At the first prism P1 of the present embodiment, an illumination light reflection surface 11 is not provided. The optical unit PU is provided with a mirror member 80 configured to reflect and guide illumination light L1 to the first prism P1. A lens portion 18 is provided facing the mirror member 80 at the first prism P1. The lens portion 18 is configured to collect and guide the illumination light L1 to a digital micromirror device DP, the illumination light L1 having been reflected on the mirror member 80. An incident surface 12 is formed at the lens portion 18. Moreover, the mirror member 80 and the third prism P3 are arranged such that the optical axis of incident light of the mirror member 80 and the optical axis of reflected light of an ON light reflection surface 31 are substantially parallel to each other.

In the present embodiment, advantageous effects similar to those of the first and third embodiments can be provided. Moreover, the mirror member 80 configured to reflect and guide the illumination light L1 to the first prism P1 is provided, and the first prism P1 includes the lens portion 18 configured to collect and guide the illumination light L1 to the digital micromirror device DP, the illumination light L1 having been reflected on the mirror member 80. With this configuration, the illumination light L1 can be efficiently guided to the digital micromirror device DP.

Fifth Embodiment

Figure 12:
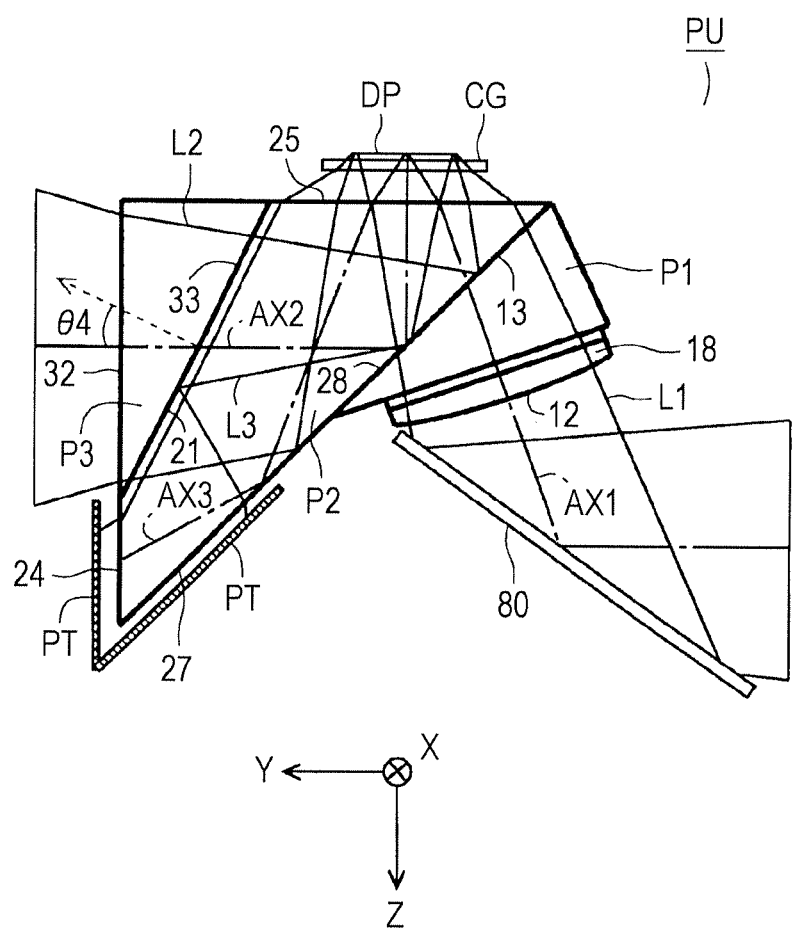
FIG. 12 is a side view of an optical unit according to a fifth embodiment of the present invention.

Next, a fifth embodiment of the present invention will be described. FIG. 12 is a side view of an optical unit of the fifth embodiment. For the sake of description, the same reference numerals as those of the first embodiment illustrated in FIGS. 1 to 8 and the fourth embodiment illustrated in FIG. 11 are used to represent equivalent elements. In the present embodiment, arrangement of first to third prisms P1 to P3 is different from that of the first embodiment. Moreover, the present embodiment is different from the fourth embodiment in arrangement of the second prism P2 and the third prism P3. Other points are similar to those of the first and fourth embodiments.

The second prism P2 is disposed between a digital micromirror device DP and the first prism P1. The second prism P2 is disposed and sandwiched between the first prism P1 and the third prism P3 in a Y-direction. Moreover, the first prism P1 and the third prism P3 are within the width of the second prism P2 in a Z-direction.

An incident surface 25 of the second prism P2 faces a cover glass CG. An OFF light reflection surface 21 inclines closer to a projection optical system LN (see FIG. 4) with a distance from the digital micromirror device DP. In addition to an emission surface 24 formed at a front surface of the second prism P2, an emission surface 27 configured to emit OFF light L3 is formed at a back surface of the second prism P2. A light absorption member PT is provided facing the emission surface 27 with a distance therefrom. Moreover, a reflection surface 28 is formed at an end surface of the second prism P2 closer to an emission surface 13. The reflection surface 28 inclines closer to the projection optical system LN with a distance from the digital micromirror device DP.

An incident surface 33 of the third prism P3 inclines closer to the projection optical system LN with a distance from the digital micromirror device DP.

When an angle between the normal of the OFF light reflection surface 21 and the optical axis AX2 of ON light L2 in the vicinity of the OFF light reflection surface 21 is θ4 and θ1 is replaced with θ4 in the condition expression (1), if the condition expression (1) is satisfied, the OFF light reflection surface 21 allows transmission of the ON light L2, and can substantially totally reflect the OFF light L3.

In the optical unit PU of the present embodiment, illumination light L1 input to the first prism P1 through an incident surface 12 after reflection on a mirror member 80 is input to the second prism P2 from the emission surface 13. The illumination light L1 transmitted through the second prism P2 is input to the digital micromirror device DP.

The ON light L2 reflected on a micromirror MR in an ON state is input to the second prism P2 through the incident surface 25. After reflection on the reflection surface 28, the ON light L2 is transmitted through the OFF light reflection surface 21, and then, is input to the third prism P3. The ON light L2 input to the third prism P3 is emitted from an emission surface 32 toward the projection optical system LN. In this state, the optical axis of incident light of the mirror member 80 and the optical axis of the ON light L2 reflected on the reflection surface 28 are substantially parallel to each other.

The OFF light L3 reflected on a micromirror MR in an OFF state is input to the second prism P2 through the incident surface 25. A portion of the OFF light L3 input to the second prism P2 is reflected on the reflection surface 28, and then, is reflected on the OFF light reflection surface 21. The OFF light L3 is emitted from the emission surface 27, and then, is discharged to the outside of the second prism P2. Moreover, a portion of the OFF light L3 input to the second prism P2 is emitted from the emission surface 24 without entering the OFF light reflection surface 21. Moreover, the OFF light L3 reflected on an end surface 22a of a first region 22 is emitted from the emission surface 24 and the emission surface 27, and then, is discharged to the outside of the second prism P2.

In the present embodiment, advantageous effects similar to those of the first and fourth embodiments can be also provided. Moreover, the first prism P1 and the third prism P3 are within the width of the second prism P2 in the Z-direction. With this configuration, the optical unit PU can be downsized.

Note that in the third to fifth embodiments, the refraction index of the first prism P1 may be different from those of the second prism P2 and the third prism P3. In this case, there is no major obstacle because the imaging performance of the lenses 51, 52 of the projection optical system LN is not lowered.

INDUSTRIAL APPLICABILITY

One or more embodiments of the present invention can be utilized for an optical unit including a digital micromirror device configured to drive each micromirror with respect to two axes and a projector including such an optical unit.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

REFERENCE SIGNS LIST

PJ projector
LN projection optical system
PU optical unit
PT light absorption member
DP digital micromirror device
DS image display surface
MR micromirror
MS pixel reflection surface
CG cover glass
P1 first prism
P2 second prism
P3 third prism
L1 illumination light
L2 ON light (projection light)
L3 OFF light (unnecessary light)
AX1 optical axis of illumination light
AX2 optical axis of projection light (ON light)
AX3 optical axis of OFF light
MS1 reference plane
MS2 ON reflection surface
MS3 OFF reflection surface
PL projection optical axis plane
1 light source
2 illumination optical system
3 control section
4 actuator
11 illumination light reflection surface
18 lens portion
21 OFF light reflection surface
31 ON light reflection surface
51, 52, 71 lens
80 mirror member
AX optical axis
SC screen

The invention claimed is:
1. An optical unit comprising:
a digital micromirror device that forms an image in such a manner that illumination light is intensity-modulated by ON/OFF control of surface inclination of each of a plurality of micromirrors at an image display surface including the plurality of micromirrors, and drives, with respect to two axes, each micromirror to be ON/OFF controlled;
a first prism that guides the illumination light to the digital micromirror device;
a second prism having an OFF light reflection surface that reflects OFF light reflected on at least one of the micromirrors in an OFF state, and allows transmission of ON light reflected on at least one of the micromirrors in an ON state; and
a third prism that receives the ON light emitted from the second prism to output the ON light to a projection side,
wherein the at least one of the micromirrors reflects the OFF light in such a direction that an optical axis of the OFF light does not lie in a projection optical axis plane that comprises an optical axis of the ON light and an optical axis of the illumination light, the second prism emits the OFF light through an emission surface intersecting the projection optical axis plane, a region of the second prism on one side of the projection optical axis plane including the optical axis of the OFF light, and an end surface of the region facing the projection optical axis plane forms a reflection surface that reflects and guides the OFF light to the emission surface, and wherein a condition expression (1) is satisfied:

$$\theta a \geq \theta 1 \geq \theta b \quad (1)$$

where $$\theta a = \sin^{-1}(1/n) - \sin^{-1}\{\sin(\alpha + \theta F - 2\cdot\beta)/n\}$$

$$\theta b = \sin^{-1}\sqrt{[\{n^2-1+\cos^2(\alpha-\theta F)\cdot\cos^2(2\cdot\gamma)\}/\{n^2-\cos^2(\alpha-\theta F)\cdot\sin^2(2\cdot\gamma)\}]} - \sin^{-1}\sqrt{[(n^2-1)/\{n^2-\cos^2(\alpha-\theta F)\cdot\sin^2(2\cdot\gamma)\}]}$$

$$\theta F = \sin^{-1}(\tfrac{1}{2}\cdot F)$$

α represents an angle between an optical axis of incident light of the digital micromirror device and a normal of the digital micromirror device, β represents an angle between a normal of the at least one of the micromirrors in the ON state and the normal of the digital micromirror device, γ represents an angle between a normal of the at least one of the micromirrors in the OFF state and the normal of the digital micromirror device, n represents a refraction index of the second prism, F represents an F number, and θ1 represents an angle between the normal of the digital micromirror device and a normal of the OFF light reflection surface.

2. The optical unit according to claim 1, further comprising:
a light absorption member that faces the emission surface of the second prism with a distance therefrom.

3. The optical unit according to claim 1, wherein
the first prism has an illumination light reflection surface that reflects the illumination light,
the ON light is transmitted through the illumination light reflection surface, and
a condition expression (2) is satisfied:

$$\theta c \geq \theta 2 \geq \theta d \quad (2)$$

where $$\theta c = \sin^{-1}(1/n1) + \sin^{-1}\{\sin(\alpha-\theta F-2\cdot\beta)/n1\}$$

$$\theta d = \sin^{-1}(1/n1) - \sin^{-1}\{\sin(\alpha-\theta F)/n1\}$$

$$\theta F = \sin^{-1}(\tfrac{1}{2}\cdot F)$$

n1 represents a refraction index of the first prism, and

θ2 represents an angle between the normal of the digital micromirror device and a normal of the illumination light reflection surface.

4. The optical unit according to claim 1, wherein
the illumination light emitted from the first prism is transmitted through the third prism and the second prism in this order, and is guided to the micromirrors, the ON light reflected on the at least one of the micromirrors is input to the third prism through the second prism, is reflected on an ON light reflection surface provided at the third prism, and is output toward the projection side, and
a condition expression (3) is satisfied:

$$\theta e \geq \theta 3 \geq \theta h \quad (3)$$

where $$\theta e = \sin^{-1}(1/n3) + \sin^{-1}\{\sin(\alpha-\theta F)/n3\}$$

$$\theta h = \sin^{-1}(1/n3) - \sin^{-1}\{\sin(\alpha-\theta F-2\cdot\beta)/n3\}$$

$$\theta F = \sin^{-1}(\tfrac{1}{2}\cdot F)$$

n3 represents a refraction index of the third prism, and

θ3 represents an angle between the normal of the digital micromirror device and a normal of the ON light reflection surface.

5. The optical unit according to claim 1, wherein
the illumination light emitted from the first prism is guided to the micromirrors through the second prism, and
the ON light reflected on the at least one of the micromirrors is transmitted through the second prism, the first prism, and the third prism in this order.

6. The optical unit according to claim 5, wherein
the first prism and the second prism do not protrude with respect to an emission surface of the third prism, the emission surface emitting the ON light toward the projection side.

7. A projector comprising:

a light source;

the optical unit according to claim 1;

an illumination optical system that emits illumination light toward the optical unit; and a projection optical system that enlarges and projects an image on a screen, the image being displayed on the digital micromirror device.

8. An optical unit comprising:

a digital micromirror device that forms an image in such a manner that illumination light is intensity-modulated by ON/OFF control of surface inclination of each of a plurality of micromirrors at an image display surface including the plurality of micromirrors, and drives, with respect to two axes, each micromirror to be ON/OFF controlled;

a first prism that guides the illumination light to the digital micromirror device;

a second prism having an OFF light reflection surface that reflects OFF light reflected on at least one of the micromirrors in an OFF state, and allows transmission of ON light reflected on at least one of the micromirrors in an ON state; and a third prism that receives the ON light emitted from the second prism to output the ON light to a projection side, wherein the at least one of the micromirrors reflects the OFF light in such a direction that an optical axis of the OFF light does not lie in a projection optical axis plane that comprises an optical axis of the ON light and an optical axis of the illumination light, the second prism emits the OFF light through an emission surface intersecting the projection optical axis plane, a region of the second prism on one side of the projection optical axis plane including the optical axis of the OFF light, and an end surface of the region facing the projection optical axis plane forms a reflection surface that reflects and guides the OFF light to the emission surface, and wherein the first prism has an illumination light reflection surface that reflects the illumination light, the ON light is transmitted through the illumination light reflection surface, and a condition expression (2) is satisfied:

$$\theta c \geq \theta 2 \geq \theta d \quad (2)$$

where $\theta c = \sin^{-1}(1/n1) + \sin^{-1}\{\sin(\alpha - \theta F - 2\cdot\beta)/n1\}$ $\theta d = \sin^{-1}(1/n1) - \sin^{-1}\{\sin(\alpha - \theta F)/n1\}$ $\theta F = \sin^{-1}(\frac{1}{2}\cdot F)$ α represents an angle between an optical axis of incident light of the digital micromirror device and a normal of the digital micromirror device, β represents an angle between a normal of the at least one of the micromirrors in the ON state and the normal of the digital micromirror device, n1 represents a refraction index of the first prism, F represents an F number, and θ2 represents an angle between the normal of the digital micromirror device and a normal of the illumination light reflection surface.

9. The optical unit according to claim 8, further comprising:
a light absorption member that faces the emission surface of the second prism with a distance therefrom.

10. A projector comprising:
a light source;
the optical unit according to claim 8;
an illumination optical system that emits illumination light toward the optical unit; and
a projection optical system that enlarges and projects an image on a screen, the image being displayed on the digital micromirror device.

11. An optical unit comprising:
a digital micromirror device that forms an image in such a manner that illumination light is intensity-modulated by ON/OFF control of surface inclination of each of a plurality of micromirrors at an image display surface including the plurality of micromirrors, and drives, with respect to two axes, each micromirror to be ON/OFF controlled;
a first prism that guides the illumination light to the digital micromirror device;
a second prism having an OFF light reflection surface that reflects OFF light reflected on at least one of the micromirrors in an OFF state, and allows transmission of ON light reflected on at least one of the micromirrors in an ON state; and
a third prism that receives the ON light emitted from the second prism to output the ON light to a projection side,
wherein the at least one of the micromirrors reflects the OFF light in such a direction that an optical axis of the OFF light does not lie in a projection optical axis plane that comprises an optical axis of the ON light and an optical axis of the illumination light, the second prism emits the OFF light through an emission surface intersecting the projection optical axis plane, a region of the second prism on one side of the projection optical axis plane including the optical axis of the OFF light, and an end surface of the region facing the projection optical axis plane forms a reflection surface that reflects and guides the OFF light to the emission surface, and
wherein the ON light reflected on the at least one of the micromirrors is transmitted through the first prism, the second prism, and the third prism in this order, and the OFF light reflected on the at least one of the micromirrors is input to the second prism through the first prism.

12. The optical unit according to claim 11, wherein
the first prism and the second prism do not protrude with respect to an emission surface of the third prism, the emission surface emitting the ON light toward the projection side.

13. The optical unit according to claim 11, further comprising:
a light absorption member that faces the emission surface of the second prism with a distance therefrom.

14. A projector comprising:
a light source;
the optical unit according to claim 11;
an illumination optical system that emits illumination light toward the optical unit; and
a projection optical system that enlarges and projects an image on a screen, the image being displayed on the digital micromirror device.

15. An optical unit comprising:
a digital micromirror device that forms an image in such a manner that illumination light is intensity-modulated by ON/OFF control of surface inclination of each of a plurality of micromirrors at an image display surface including the plurality of micromirrors, and drives, with respect to two axes, each micromirror to be ON/OFF controlled;
a first prism that guides the illumination light to the digital micromirror device;
a second prism having an OFF light reflection surface that reflects OFF light reflected on at least one of the micromirrors in an OFF state, and allows transmission of ON light reflected on at least one of the micromirrors in an ON state; and
a third prism that receives the ON light emitted from the second prism to output the ON light to a projection side,
wherein the at least one of the micromirrors reflects the OFF light in such a direction that an optical axis of the OFF light does not lie in a projection optical axis plane that comprises an optical axis of the ON light and an optical axis of the illumination light, the second prism emits the OFF light through an emission surface intersecting the projection optical axis plane, a region of the second prism on one side of the projection optical axis plane including the optical axis of the OFF light, and an end surface of the region facing the projection optical axis plane forms a reflection surface that reflects and guides the OFF light to the emission surface, and
wherein the illumination light input to the first prism is transmitted through the first prism, the third prism, and the second prism in this order, and is guided to the micromirrors, the ON light reflected on the at least one of the micromirrors is input to the third prism through the second prism, is reflected on an ON light reflection surface provided at the third prism, and is output toward the projection side, and
a condition expression (3) is satisfied:

$$\theta e \geq \theta 3 \geq \theta h \quad (3)$$

where $\theta e = \sin^{-1}(1/n3) + \sin^{-1}\{\sin(\alpha - \theta F)/n3\}$ $\theta h = \sin^{-1}(1/n3) - \sin^{-1}\{\sin(\alpha - \theta F - 2\cdot\beta)/n3\}$ $\theta F = \sin^{-1}(\frac{1}{2}\cdot F)$ α represents an angle between an optical axis of incident light of the digital micromirror device and a normal of the digital micromirror device, β represents an angle between a normal of the at least one of the micromirrors in the ON state and the normal of the digital micromirror device, n3 represents a refraction index of the third prism, F represents an F number, and θ3 represents an angle between the normal of the digital micromirror device and a normal of the ON light reflection surface.

16. The optical unit according to claim 15, wherein the first prism has an illumination light reflection surface that reflects the illumination light toward the micromirrors.

17. The optical unit according to claim 15, further comprising:

a mirror member that reflects and guides the illumination light to the first prism, wherein the first prism includes a lens portion that collects and guides the illumination light to the digital micromirror device, the illumination light having been reflected on the mirror member.

18. The optical unit according to claim 15, further comprising:

a light absorption member that faces the emission surface of the second prism with a distance therefrom.

19. A projector comprising:

a light source;

the optical unit according to claim 15;

an illumination optical system that emits illumination light toward the optical unit; and a projection optical system that enlarges and projects an image on a screen, the image being displayed on the digital micromirror device.

* * * * *